(12) United States Patent
Tegnell et al.

(10) Patent No.: US 7,836,217 B2
(45) Date of Patent: Nov. 16, 2010

(54) ASSOCIATING AND EVALUATING STATUS INFORMATION FOR A PRIMARY INPUT PARAMETER VALUE FROM A PROFIBUS DEVICE

(75) Inventors: Johan Ingemar Tegnell, Mansfield, MA (US); Benno Doll, Fellbach (DE); Miroslav Radomirov Radev, Mansfield, MA (US)

(73) Assignee: Invensys Systems, Inc., Foxboro, MA (US)

( * ) Notice: Subject to any disclaimer, the term of this patent is extended or adjusted under 35 U.S.C. 154(b) by 793 days.

(21) Appl. No.: 11/777,492

(22) Filed: Jul. 13, 2007

(65) Prior Publication Data

US 2009/0019146 A1 Jan. 15, 2009

(51) Int. Cl.
*G06F 3/00* (2006.01)
(52) U.S. Cl. ............................................. 710/15; 710/8
(58) Field of Classification Search .................. 710/8, 710/15
See application file for complete search history.

(56) References Cited

U.S. PATENT DOCUMENTS

| | | | |
|---|---|---|---|
| 6,285,966 B1 * | 9/2001 | Brown et al. | 702/188 |
| 6,449,715 B1 * | 9/2002 | Krivoshein | 713/1 |
| 7,099,451 B1 * | 8/2006 | Jordan et al. | 379/212.01 |
| 2007/0013701 A1 * | 1/2007 | Segawa et al. | 345/502 |

* cited by examiner

*Primary Examiner*—Niketa I Patel
*Assistant Examiner*—Zachary K Huson
(74) *Attorney, Agent, or Firm*—Leydig, Voit & Mayer, Ltd

(57) ABSTRACT

A method and system are disclosed for managing Profibus device information in a distributed control system. After receiving input parameter data originating from a Profibus device message, the I/O module assembly performs steps for processing, maintaining and providing the input parameter data to a requesting control processor. The processing step includes extracting input parameter values from a received Profibus device message. The extracted input parameters are then deposited in a repository on the I/O module assembly, such that for a primary input parameter, the I/O module assembly stores at least: (1) a measured value, and (2) a status value. Furthermore, the I/O module assembly maintains a reference linking the first status parameter to the first input parameter. The I/O module assembly provides a data status value with the measured value for the first input parameter in accordance with an I/O read operation. The data status value is based on the status value for the first status parameter.

20 Claims, 11 Drawing Sheets

- I/O Module Bus Parameters — 400
- I/O Module Configuration Data — 410
- Profibus Device Bus Parameters — 420
- Profibus Device Modules and User Parameters Configuration — 430
- Profibus Device Status Mask — 440
- Profibus Device Configuration Data — 450

FIG. 4

FBM Settings

| | |
|---|---|
| Master Station Address | 1 |
| Highest Station Address | 2 |
| Min Slave Interval | 125 ms |
| Data Control Time | 150 ms |
| Auto CLEAR on Error | ☐ |

FBM222 Bus Parameters

| | |
|---|---|
| Segment Coupler | None |
| Baud Rate | 500 kBaud |

Default   Validate   Optimize Timing

Max Retry Limit: 1          GAP Update Factor (G) = 1

| | | |
|---|---|---|
| Slot Time (TSL) | 200 | TBit |
| Min Station Delay Response Time (MinTSDR) | 11 | TBit |
| Max Station Delay Response Time (MaxTSDR) | 100 | TBit |
| Setup Time (TSET) | 1 | TBit |
| Quiet Time (TQUI) | 0 | TBit |
| Target Rotation Time (TTR) | 100000 | TBit |

FIG. 5

| Min Station Delay Response Time (MinTSDR) | 11 | TBit |

Watchdog
☑ Enable    Timeout 250    ms (presicion: 10ms)

Mode Support
☐ Sync    ☐ Freeze

Device Timeout for Disable Communication
☑ Enable    Timeout 120    ms

Groups
☐ 1  ☐ 2  ☐ 3  ☐ 4  ☐ 5  ☐ 6  ☐ 7  ☐ 8

DPV1
☑ Enable DPV1    DPV1 Response Timeout 400    10 ms
☐ FailSafe    ☐ Watchdog time base in 1 ms

Available Modules

| Name | Input | Output | Data | Possible Slots |
|---|---|---|---|---|
| Empty slot | 0 bytes | 0 bytes | 0x00 | 1,2,3,4,5,6,7,8,9,10,11,1... |
| GDP1,5Ex | 0 bytes | 0 bytes | 0x01,0x02 | 0 |
| GDP1,5Ex D | 0 bytes | 0 bytes | 0x01,0x2C | 0 |
| GDP1,5Ex CD | 2 bytes | 2 bytes | 0xC1,0x40,0x4... | 0 |
| DM8Ex | 1 bytes | 1 bytes | 0xC1,0x00,0x0... | 1,2,3,4,5,6,7,8,9,10,11,1... |
| DM8Ex S | 2 bytes | 1 bytes | 0xC1,0x00,0x0... | 1,2,3,4,5,6,7,8,9,10,11,1... |
| DM8Ex 8I | 1 bytes | 0 bytes | 0x41,0x00,0x06 | 1,2,3,4,5,6,7,8,9,10,11,1... |
| DM8Ex S 8I | 2 bytes | 0 bytes | 0x41,0x01,0x07 | 1,2,3,4,5,6,7,8,9,10,11,1... |
| DO40Ex | 0 bytes | 1 bytes | 0x81,0x00,0x08 | 1,2,3,4,5,6,7,8,9,10,11,1... |
| DI40Ex | 1 bytes | 0 bytes | 0x41,0x00,0x09 | 1,2,3,4,5,6,7,8,9,10,11,1... |
| DF20Ex P | 8 bytes | 2 bytes | 0xC1,0x01,0x0... | 1,2,3,4,5,6,7,8,9,10,11,1... |

Configured Modules[Cfg_Data(Length : 9 bytes)]

| Slot No | Name | Input | Output | Data |
|---|---|---|---|---|
| 0 | GDP1,5Ex | 0 | 0 | 0x01,0x02 |
| 1 | Empty slot | 0 | 0 | 0x00 |
| 2 | Empty slot | 0 | 0 | 0x00 |
| 3 | Empty slot | 0 | 0 | 0x00 |
| 4 | Empty slot | 0 | 0 | 0x00 |
| 5 | Empty slot | 0 | 0 | 0x00 |
| 6 | Empty slot | 0 | 0 | 0x00 |
| 7 | Empty slot | 0 | 0 | 0x00 |
| 8 | | | | |
| 9 | | | | |
| 10 | | | | |
| 11 | | | | |

[Add / Replace] [Remove] [Show Config Data]

Max. Input Len  216 bytes   Max. Output Len  216 bytes   Max. Modules  17
Act. Input Len  0 bytes     Act. Output Len  0 bytes     Configured Modules  8

FIG. 8

Parameters

Module                                  Module Parameters

| Module Name | Parameter Name | Value |
|---|---|---|
| excom (mode 1) | prm. mode | mode 1 |
| GDP1,5Ex | grid frequency | 50Hz |
| Empty slot | analog data format | status MSB |
| Empty slot | backplane | MT18 (16 I/O modules) |
| Empty slot | redundancy mode | off |
| Empty slot | power supply | single |
| Empty slot | HCIR active | off |
| Empty slot | HCIR WCBC factor | base x 1 |
| Empty slot | HCIR WCBC base (x 100ms) | 5 |
| | address offset | disable |
| | address offset value | 0 |
| | SF1 | select 0 |
| | SF2 | select 0 |
| | SF3 | select 0 |

User Param Data(14)

0x00,0x00,0x00,0x40,0x00,0x00,0x05,0x00,0x00,0x00,0x00,0x00,0x00,0x00

Max_Usr_Prm_Data_Len:  87 bytes   ☐ Add DPV1 Bytes      Edit..

| | Name | Data Type | Byte Pos | Bit Pos | Bit Length | Description |
|---|---|---|---|---|---|---|
| − | M1 | GDP1.5Ex CD | | | | |
| | Parameter1 | Integer | 1 | 1 | 3 | Demo Parameter |
| + | M2 | DM80Ex | | | | |
| + | M3 | DM80Ex S | | | | |

Module and Input Data Structure

| | # | Data |
|---|---|---|
| − | M1 | GDP1.5Ex CD |
| | 1 | Byte |
| | 2 | Byte |
| + | M2 | DM80Ex |
| + | M3 | DM80Ex S |

FIG. 9

Input Parameter Definition - Example

| Name | Data Type | Byte Pos | Bit Pos | Bit Length | Description | Unit | Lower Range | Upper Range | Swapping | Complement | Sign Bit Pos | Status Parameter | Good Status |
|---|---|---|---|---|---|---|---|---|---|---|---|---|---|
| Pressure | Real | 0 | 0 | 32 | pressure measurement | bar | 0 | 200 | No swapping | No Complement | 0 | Pressure_Status | |
| Pressure_Status | Byte | 4 | 0 | 8 | status for pressure measurement | | | | No swapping | No Complement | | | 01-1-1-0 |
| Temperature | Real | 5 | 0 | 32 | temperature measurement | C | -20 | 200 | No swapping | No Complement | 0 | Temparature_Status | |
| Temperature_Status | Byte | 9 | 0 | 8 | status for temperature measurement | | | | No swapping | No Complement | | | 11--01-- |
| Position_Readback | Real | 10 | 0 | 32 | readback of the position | % | -10 | 110 | No swapping | No Complement | 0 | | |

FIG. 10

Output Parameter Definition - Example

| Name | Data Type | Byte Pos | Bit Pos | Bit Length | Description | Unit | Lower Range | Upper Range | Swapping | Sign Bit Pos | Readback Parameter |
|---|---|---|---|---|---|---|---|---|---|---|---|
| Position | Real | 0 | 0 | 32 | Position | % | 0 | 100 | No swapping | 0 | Position_Readback |

ASSOCIATING AND EVALUATING STATUS INFORMATION FOR A PRIMARY INPUT PARAMETER VALUE FROM A PROFIBUS DEVICE

FIELD OF THE INVENTION

This invention relates generally to networked computerized industrial process control systems and, more particularly, relates to utilities providing lifetime support of field devices such as transmitters, positioners, etc. Tasks associated with such lifetime support include configuring, commissioning, monitoring, maintaining and replacing the field devices within an industrial process control system environment including potentially many types of field device types. More particularly, the present invention relates to a process control network, such as a Profibus network, wherein information relating to a set of field devices is acquired and concentrated in a single bus master that, in turn, provides corresponding information to a variety of supervisory/control nodes.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to data collection and/or control systems. Such measurements come in a wide variety of forms and are used by industrial process control systems to regulate a variety of operations, both with respect to continuous and discrete manufacturing processes. By way of example the measurements produced by a sensor/recorder include: a temperature, a pressure, a pH, a mass/volume flow of material, a quantity of bottles filled per hour, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as adjust a valve position, or even move equipment into and out of service as required.

Typical industrial processes today are extremely complex and comprise many intelligent devices such as transmitters, positioners, motor drives, limit switches and other communication enabled devices. By way of example, it is not unheard of to have thousands of sensors and control elements (e.g., valve actuators) monitoring/controlling aspects of a multi-stage process within an industrial plant. As field devices have become more advanced over time, the process of setting up field devices for use in particular installations has also increased in complexity.

In previous generations of industrial process control equipment, and more particularly field devices, transmitters and positioners were comparatively simple components. Before the introduction of digital (intelligent) transmitters, setup activities associated with a field device were relatively simple. Industry standards like 3-15 psi for pneumatic instruments or 4-20 ma for electronic instruments allowed a degree of interoperability that minimized setup and configuration of analog transmitters.

More contemporary field devices include digital data transmitting capabilities and on-device digital processors, referred to generally as "intelligent" field devices. Such devices generally support an extensive set of parameters for providing a variety of status and process variable values.

One particular class of intelligent field device incorporates the Profibus protocol/architecture. In process control systems that embody the Profibus protocol, an example of a Profibus device hardware configuration includes a device I/O module and a set of field I/O cards that connect the Profibus device I/O module to a set of field devices. The device I/O module receives data from the set of field I/O cards and merges the received data into a single message string. The single message string is transmitted by the device I/O module of the Profibus device to an I/O module assembly (e.g., an Invensys FBM222).

In the known Profibus systems, the I/O module assembly receives messages from Profibus devices wherein each received message contains the combined data for all signals provided by the field I/O cards installed on a corresponding Profibus device rack. Known I/O module assemblies are programmed to provide the received messages in their unprocessed form to requesting entities such as control processors and system management applications/interfaces. In the known systems, a control processor, configured to execute a set of distributed control interface (DCI) blocks, submits requests for particular individual pieces of information in association with the execution of the DCI blocks. The requests from the control processors pertain to individual pieces of information contained within Profibus messages rather than groups of information provided within Profibus messages. Therefore, a separate request is submitted by a control processor to an I/O module assembly for each piece of information that is read or written.

Profibus device messages potentially carry a variety of information. In addition to providing process variable measurement values, the message data potentially includes a variety of status information provided in the form of status bits. In some instances each status bit is pre-configured to have a particular meaning. Known I/O module assemblies are capable of extracting and forwarding the contents of the received messages, including the status bits, to control processors (in response to the aforementioned DCI block-initiated requests). In some known systems, each status bit is associated with an LED on a Profibus device LED panel, the meaning of which is determined by consulting a user guide associated with the LED panel of the customized Profibus device.

SUMMARY OF THE INVENTION

A method and system are presented herein for managing Profibus device information in a distributed control system. In such system, a Profibus device is communicatively coupled via a network link to an I/O module assembly (e.g., a field bus module), and the I/O module assembly receives Profibus device messages from the Profibus device containing information relating to connected device modules. The I/O module assembly includes one or more tasks for extracting and processing information contained within the received Profibus device messages according to a Profibus device configuration. In particular, after receiving input parameter data originating from a Profibus device message issued by a connected Profibus device, the I/O module assembly performs a series of additional steps for processing, maintaining and providing the input parameter data to, for example, a requesting control processor.

During the processing step an I/O request processing task, in accordance with the Profibus device configuration, processes the Profibus device message. The processing step includes initially extracting input parameter values from the Profibus device message according to input parameter configuration entries in the Profibus device configuration. The extracted input parameters are then deposited in an I/O data repository on the I/O module assembly. In particular, the I/O module assembly stores at least: (1) a measured value for a first input parameter, and (2) a status value for a first status parameter corresponding to the first input parameter. Furthermore, the I/O module assembly maintains a reference linking the first status parameter to the first input parameter.

Thereafter, the I/O module assembly provides a data status value with the measured value for the first input parameter in accordance with an I/O read operation executed on the I/O module assembly. The data status value provided by the I/O module assembly is based on the status value for the first status parameter. The I/O read operation is issued, for example, by a control processor that executes a control loop that includes the measured value.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 identifies a set of fields that comprise a portion of a configuration file for an I/O module assembly coupled to a set of Profibus devices;

FIG. 5 illustratively depicts an exemplary graphical user interface for specifying I/O module bus parameters and I/O module configuration data;

FIG. 6 depicts an exemplary user interface for specifying Profibus device bus parameters;

FIG. 7 depicts an exemplary graphical user interface for configuring a set of modules associated with a Profibus device;

FIG. 8 depicts an exemplary graphical user interface for displaying user parameters (name and current value) of a selected module;

FIG. 9 depicts an exemplary user interface for defining cyclic input parameters for a Profibus device;

FIG. 10 depicts an exemplary complete set of fields for the Input Parameters grid along with an exemplary set of input parameter entries;

FIG. 11 depicts an exemplary user interface for defining cyclic output parameters for a Profibus device;

FIG. 12 depicts an exemplary complete set of fields for the Output Parameters grid along with an exemplary output parameter entry;

DETAILED DESCRIPTION OF THE DRAWINGS

Figure 1:
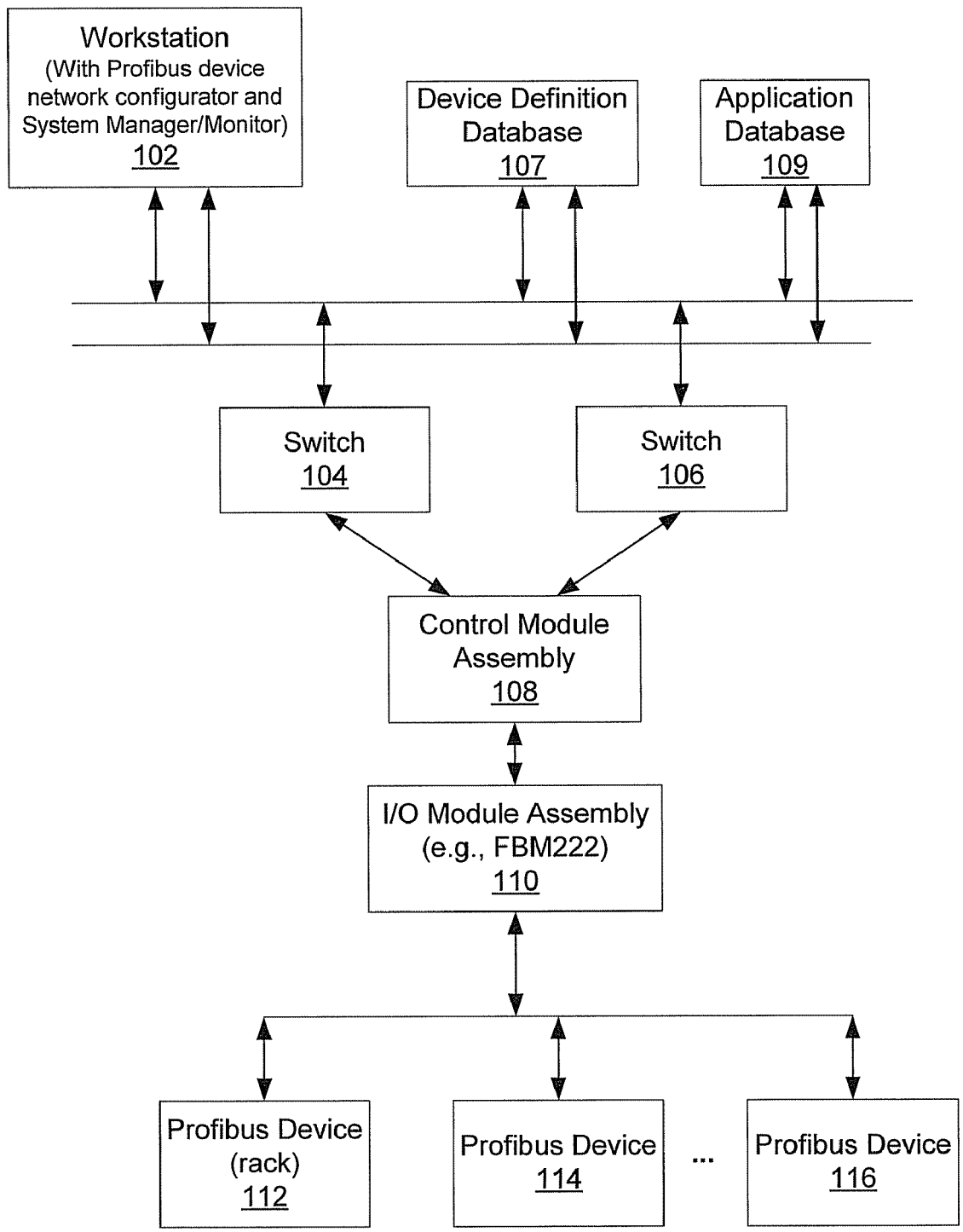
FIG. 1 is schematic diagram depicting an exemplary process control network environment wherein the present invention is potentially incorporated.

Turning to FIG. 1, an exemplary simple industrial process control system arrangement/environment is depicted. A workstation 102, comprising a variety of system configuration and monitoring applications, provides an operator/engineering interface through which an engineer/technician configures and thereafter potentially monitors the components of an industrial process control system including a Profibus device network. The workstation 102 comprises any of a variety of hardware/operating system platforms. By way of example, the workstation 102 comprises a personal computer running on the MICROSOFT WINDOWS operating system. However, alternative embodiments of the invention can potentially run on any one or more of a variety of operating systems such as: Unix, Linux, Solaris, Mac OS-X, etc.

In accordance with an exemplary embodiment, the workstation 102 hosts a Profibus device network configuration application and a System manager/monitor application. The configuration application provides access to a database (device definition database 107) for persistent storage of previously defined descriptions of configurable tasks executable by Profibus device I/O module assemblies. The Profibus device I/O module assemblies are customized via the descriptions rendered by the configuration application and then subsequently downloaded to the I/O module assemblies such as I/O module assembly 110. Access is also provided to an application database 109 that stores a set of customization definitions that were previously downloaded to I/O module assemblies.

Figure 3:
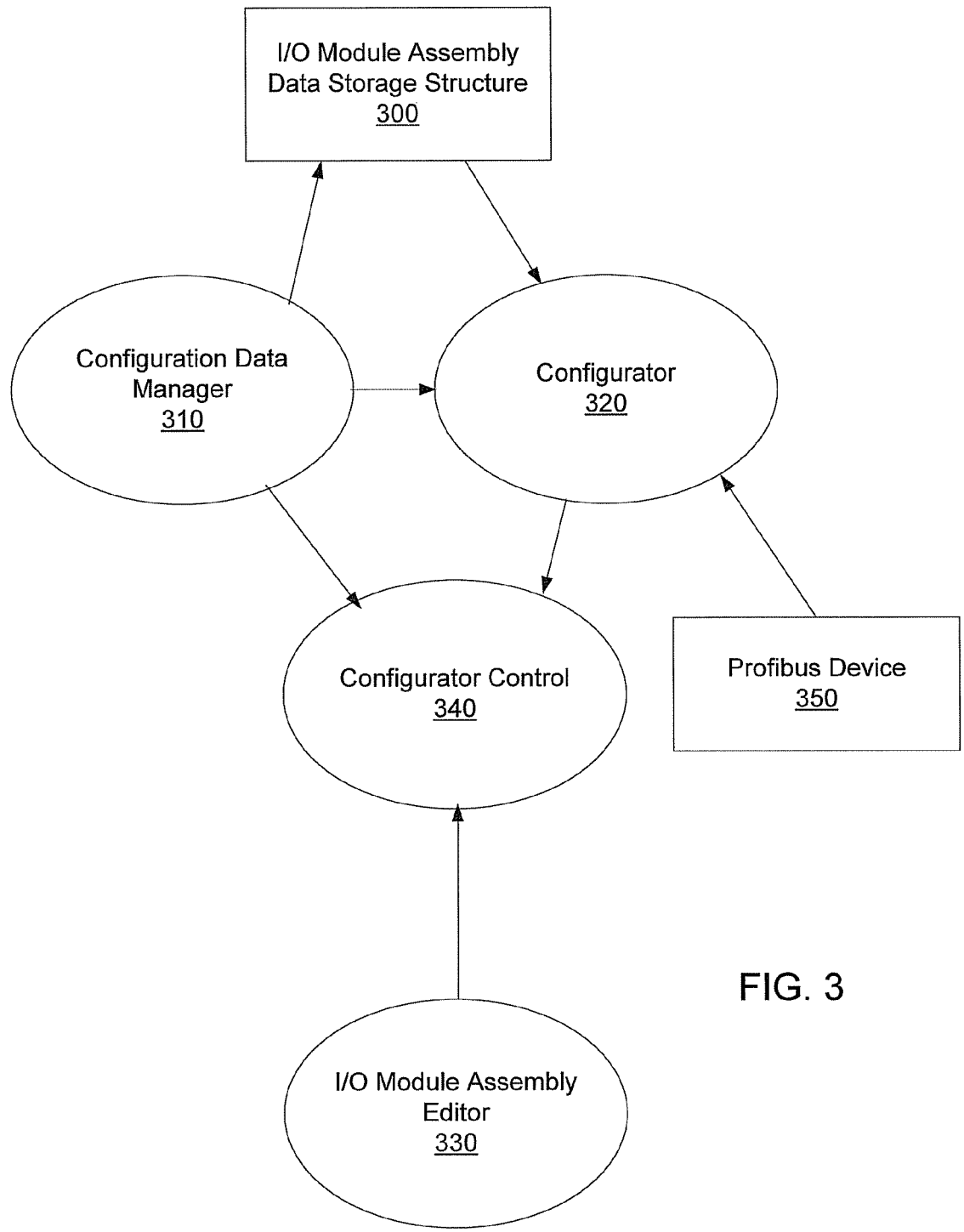
FIG. 3 schematically depicts a set of components associated with configuration of a Profibus I/O module assembly.

The configuration application provides access to a set of templates for specifying customizable tasks executed by the I/O module assembly 110 (e.g., an INVENSYS's field bus module model FBM222). The interfaces and components associated with configuring the downloadable modules of the I/O module assembly 110 are described further herein below with reference to FIG. 3.

In the illustrative example, the workstation 102, device definition database 107 and application database 109 are connected in a redundant configuration via dual Ethernet interfaces/wiring to redundant switches 104 and 106. The Ethernet switches 104 and 106 are commercially available and provided, for example, by Allied Telesyn (e.g., model AT-8088/MT). While not specifically depicted in FIG. 1, additional nodes, comprising workstations, servers and other elements (e.g., control module assemblies) of a supervisory portion of the process control system are potentially connected to the redundant switches 104 and 106. In the illustrated embodiment, a device definition database 107 and application database 109 store information regarding I/O module assembly module types (templates) and module instances, respectively. Furthermore, while hardwired connections between the workstation and switches 104 and 106 via ETHERNET local area network links are depicted in FIG. 1, such links over a local supervisory level process control network are alternatively carried out via wireless network interfaces.

The switches 104 and 106 (as well as potentially other non-depicted switches) are also communicatively coupled to a control module assembly 108. The control module assembly 108 comprises one or more control modules (also referred to as control processors). An illustrative example of such control module assembly 108 is a Foxboro CP model FCP270, by Invensys Systems, Inc. In other embodiments, process control functionality is carried out in any of a variety of control modules—even by control programs incorporated into the workstations, intelligent transmitters, or virtually any communicatively coupled device capable of executing control programs, loops, scripts, etc.

With continued reference to FIG. 1, the I/O module assembly 110, alternatively referred to as a field bus module, is connected to the control module assembly 108. The communications protocol utilized for carrying out communications between the I/O module assembly 110 and control module assembly 108 is potentially any one of a variety of proprietary/non-proprietary communications protocols. In one embodiment, the communications between the control module assembly 108 and I/O module assembly 110 are carried out via a 2 MBit HDLC communication bus. While only a single I/O module assembly 110 is depicted in the illustrative example, embodiments of the invention comprise many I/O module assemblies.

The I/O module assemblies, in general, include a variety of interfaces for communicating directly and/or indirectly to a variety of devices including, for example, Profibus devices. In the illustrative example, the I/O module assembly 110 comprises a Profibus I/O module assembly (e.g., an INVENSYS's field bus module model FBM222) that supports communications between the control module assembly 108 and a set of Profibus devices 112, 114, and 116. In the illustrative embodiment, the set of representative Profibus devices 112, 114 and 116 comprise racks containing multiple device protocol-specific cards. The Profibus devices 112, 114 and 116 communicate with a variety of field devices that operate at the lowest level of an industrial process control system to measure (transmitters) and control (positioners) plant activity.

In the exemplary embodiment, each Profibus device 112, 114, and 116 accumulates a set of values associated with the field device. The set of values are packaged in a single message containing a string of data/status bits. The single message is thereafter sent by each of the devices 112, 114 and 116 to the I/O module Assembly 110 (e.g., FBM222) for further processing. The I/O module assembly 110, after initially storing the received message in local memory, performs a variety of programmed and asynchronous tasks in response to requests from the control module assembly 108. In an exemplary embodiment, the I/O module assembly 110 responds to asynchronous requests from the control module assembly 110 (e.g., DCI block commands) to provide information relating to particular bits of data from the received/stored messages received by the assembly 110 from the Profibus devices 112, 114, and 116. In addition, the I/O Module Assembly 110 is capable of sending messages, comprising commands and data, to each of the Profibus devices 112, 114, and 116.

In accordance with another aspect of the exemplary embodiment, the configuration application for specifying the aforementioned supplementary status bit information (e.g., a text error message) for Profibus messages supports a template library wherein a set of child (grandchild, etc.) templates are defined from one or more base Profibus message configuration templates. Once defined, the templates' relationships are retained and visually displayed in the form of a collapsible/expandable hierarchical tree within a graphical user interface supported by the configuration application.

At runtime the configured tasks of the I/O module assembly 110 perform a variety of operations locally to acquire and process Profibus messages for use by process status control and monitoring applications. In accordance with an aspect of the I/O module assembly 110's runtime behavior, two distinct pieces of information, representing a primary value parameter (e.g., a measured/sensed quantity) and a status parameter quality (e.g. a status byte representing a set of test results rendered in the field for data quality), are processed locally on the I/O module assembly 110. The I/O module assembly 110, is thus capable of rendering a primary value parameter and an associated status quality (good/bad) for the primary value parameter as a single unit of response information in response to a single request from the control module assembly 108 (e.g., the request for the primary value of a parameter). Thus, for example, in addition to providing a sensor reading, the I/O module assembly 110, in response to a single request from the control module assembly 108, provides a related status of the primary value (good/bad) based upon an associated status parameter that was processed locally according to a pre-configured status criterion (e.g., a status mask).

The process control network schematically depicted in FIG. 1 is greatly simplified for purposes of illustration. Those skilled in the art will readily appreciate that both the number of components, at each depicted level of the exemplary process control system, is generally many times greater than the number of depicted components. This is especially the case with regard to the number of depicted field devices. In an actual process control environment, the number of field devices, comprising both input devices (e.g., transmitters) and output devices (e.g., positioners) number in the hundreds for an industrial process control system.

Figure 2:
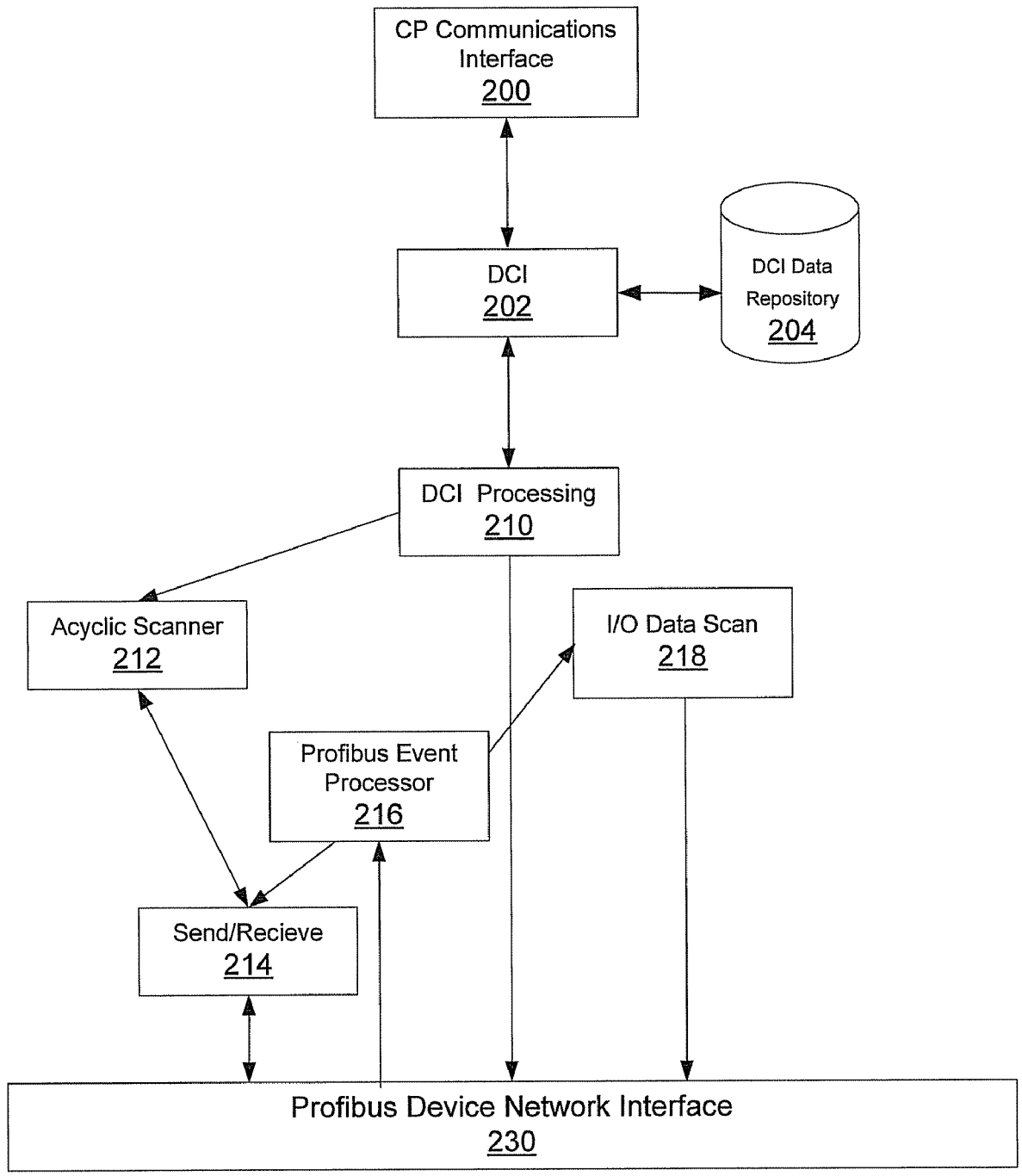
FIG. 2 schematically depicts a set of entities, and their corresponding interfaces, associated with an exemplary system embodying the present invention.

Turning to FIG. 2, a block diagram illustratively depicts functional components of an exemplary embodiment (an FBM222) of the I/O module assembly 110 for carrying out a variety of configurable tasks on behalf of control processors and other higher level control/monitor components. A set of modules (identified herein by their associated "tasks") executed within the I/O module assembly 110 are identified in FIG. 2 that facilitate receiving and processing Profibus device messages, and responding to DCI block-initiated requests from the control module assembly 108. In the exemplary embodiment, these modules cooperatively operate to implement an analytical/processing layer on top of a Profibus message communication layer that facilitates: extracting particular pieces of information from a received Profibus device message, processing particular pieces of information contained within the received Profibus device message according to previously specified configuration information (e.g., providing a data point status value with a requested data point value), and carrying out operations within the I/O module assembly 110 in response to a single received DCI calls that would otherwise need to be performed through multiple DCI calls from the control module assembly 108. The set of modules/tasks are described herein below with reference to FIG. 2.

In the exemplary embodiment, the I/O module assembly 110 communicates with the control module assembly 108 via a multi-layered control processor communications interface 200 including an HDLC (e.g., RS485) controller/protocol handler, a process I/O protocol handler, and a DCI protocol handler (for extracting and forwarding DCI calls from received messages).

A DCI task 202 module exposes an extensive set of externally callable functions for handling (responding to) DCI calls (messages) from the communications interface 200 DCI protocol handler and managing a DCI data repository 204. The callable functions support updating the content (e.g., fields) of the DCI data repository 204 that contains both configuration (connections) and runtime information relating to connectable Profibus devices and providing responses to DCI calls issued by the control module assembly 108. Other callable functions exposed by the DCI task 202 module relate to the general operation of the DCI task 202. Such general operation functions of the DCI task 202 support initializing, starting, and posting data to the DCI task 202. In an exemplary embodiment, at startup the DCI task 202 initializes access to the repository 204 and pre-builds DCI response messages. A DCI message processing function is exposed by the DCI task 202 module for invoking the processing of a DCI message passed by the DCI protocol handler of the interface 200 to the DCI task 202.

A set of functions exposed by the DCI task 202 supports accessing configuration and runtime data maintained within the DCI data repository 204. The set of functions facilitate storing Profibus device data configurations (described herein below) and runtime data associated with connectable Profibus devices. Moreover, the DCI task 202 maintains pre-built responses in the DCI data repository 204 to expedite responding to DCI requests from the control module assembly 108. Furthermore, data integrity is maintained in the repository 204 by implementing locking mechanisms.

Exemplary types of data accessed in the repository 204 via the exposed data repository access functions (e.g., "get", "set", "scan", etc.) include: I/O module assembly control/status fields, Profibus device configuration/control/status fields, and point/IOdata configuration/data fields. The I/O module assembly control fields include parameters specifying on/off line status, link status, enabling alarms, and enabling messages. The Profibus device control fields include parameters specifying: connections (e.g., handle, data size and data value), type/version, error options, diagnostics statuses, alarms, enabled/disabled status, handle, link, address, device status, file data (typically from a workstation), I/O data (Profibus device message string), configuration data (describing content of the I/O data), number of points, and point handles. The point/data connection parameters within the repository 204 accessed via the DCI task 202's interface functions include: name, I/O data, data type, connection type, configuration options, configuration data, initial value, update period, point data, connection status, registered write function (called when data is written to the I/O module assembly 110 by the control module assembly 108), link number (for a particular point), handle, and parent handle.

In accordance with particular aspects of an illustrative embodiment, the DCI task 202 cooperatively operates with a set of event processing and Profibus device data I/O tasks (implemented by corresponding modules) to carry out enhanced functionality within the I/O module assembly 110. In the absence of the enhanced functionality, completing the same functions would otherwise require multiple transactions between the I/O module assembly 110 and the control module assembly 108. Such tasks include: a DCI processing task 210, an acyclic data scanner task 212, a send/receive task 214, a Profibus event processor task 216, and an I/O data scan task 218. These tasks are described herein below with continued reference to FIG. 2.

The acyclic data scanner task 212 module supports scheduling and executing updates to acyclic data points (e.g., DCI points that utilize DP V1 acyclic services). The acyclic data scanner task 212 maintains a scan list of acyclic transactions. Each entry in the list corresponds to a configured DCI block. The acyclic data scanner task 212 periodically accesses device-specific parameters containing process data or device diagnostic data corresponding to the configured DCI blocks. The acyclic data scanner task 212 exposes a set of functions for posting, with regard to a acyclical data services: a stack response message, a scan list change message, and a port enable/disable message. The acyclic data scanner task 212 receives messages from the DCI processing task 210 to build and modify the scan list. In an exemplary embodiment, all pending requests are combined into one transaction request and forwarded to the send/receive task 214 for further processing. Thereafter, a response message received from send/receive task 214 is decoded and each response is processed individually. The decoded received data is converted to DCI data, and the DCI data is stored in the DCI data repository 204.

The DCI processing task 210 module supports processing DCI requests originating, for example, from the control module assemble 108 and forwarded by the DCI task 202. The DCI processing task 210 supports DCI block processing by maintaining DCI connections on device and DCI block data levels. The DCI processing task 210 sends messages to the acyclic data scanner task 212 and the I/O data scan task 218 to update scan lists maintained by each. The DCI processing task 210 exposes a set of functions for setting the current state of a communications stack within the Profibus device network interface 230 and for posting a request message to a request queue for the acyclic data scanner task 212. The DCI processing task 210 stores device and data status information in the DCI data repository 204 according to configured connections between DCI blocks and Profibus Device data definitions.

The Profibus event processor task 216 module processes events generated by a Profibus device and received by the I/O module 110. The Profibus event processor task 216 exposes a function for initializing a set of events upon which the event processor task 216 blocks while waiting for the event to fire. A further function starts an event processor task for each connected Profibus device. The Profibus event processor task 216 maintains a local data structure for each currently active event.

The event processor task 216 blocks while waiting for notification of particular events from the Profibus device network interface 230. Upon receiving notification of an event, the event processor task 216 processes the received event notification and the processed event is forwarded to a proper event notification destination (e.g., the DCI processing task 210, the send/receive task 214, the I/O data scan task 218, etc.).

The Profibus event processor 216 facilitates providing expedited responses to events signaled by the Profibus device network interface 230. After a particular event is received and acknowledged by the event processor task 216, based upon a particular configuration for the event, a message to a lower priority task is posted (if needed/directed) for further processing. For example, a value in the repository 204 associated with the event is potentially set to notify the control module assembly 108 of the event.

A send/receive task 214 module interfaces with a Profibus protocol stack for a physical Profibus network interface to implement the acyclic transfer of information, via the Profibus device network interface 230, between the I/O module assembly 110 and connected Profibus devices. The send/receive task 214 is a central point of communication with Profibus communication stacks supported by the I/O module assembly 110. The send/receive task 214 processes requests in the order they are received, one by one. All outstanding requests are stored, for example, in a FIFO queue. The send/receive task 214 manages service requests to the Profibus device network interface 230. The send/receive task 214 module receives pre-built request transactions from the acyclic data scanner task 212, sends the request transactions to the Profibus device network interface 230, handles corresponding responses from the network interface 230 and redirects a final response back to an source of the request transaction. The requests are initially posted to a processing queue and then processed on a FIFO basis.

The send/receive task 214 module exposes a set of functions for starting a send/receive operation, posting a new request transaction to the processing queue, posting a stack immediate response message to the processing queue, and posting a stack remote response message to the processing queue. The send/receive task 214 receives requests from the acyclic data scanner task 212 and, in response, submits an acyclic read data request to the Profibus device network interface 230. The send/receive task 214 module receives request result notifications from the Profibus event processor task 216 and, in response, accesses the network interface 230 to obtain the response message data. The send/receive task 214 module posts a message to the acyclic data scanner task 212 containing response data.

The I/O data scan task 218 module supports updates to cyclic data. The I/O data scan task 218 maintains a local version of the cyclic scan list for the I/O module assembly 110 to read I/O data from Profibus devices, convert the received data into DCI format, and update the DCI data repository 204. The I/O data scan task 218 exposes functions for initializing and starting I/O data acquisition tasks and depositing I/O data into an I/O data processing queue. In an exemplary embodiment, events from a Profibus communication stack in the Profibus device network interface 230 signal the completion of each update cycle, and in response the I/O data scan task 218 updates DCI connection records in the DCI data repository 204. For Profibus devices with a defined input status value parameter, the I/O data scan task 218 evaluates the associated status parameter byte for an input primary value parameter and updates a corresponding DCI block data item (e.g., a good/bad status).

Having described the runtime operation of the I/O module assembly 110, attention is directed to configuration of the assembly 110. Initially, attention is directed to an exemplary arrangement for configuration of the I/O module assembly 110 depicted in FIG. 3. In the exemplary embodiment, an I/O module assembly data storage structure 300, containing a set of configuration settings for the I/O module assembly 110, is created during a configuration session. The storage structure 300 receives a configuration byte stream for the I/O module assembly 110 from a configuration data manager 310 based upon on a set of current configuration settings. A configurator 320 validates the set of current configuration settings of the storage structure 300.

An I/O module assembly editor 330 provides a user interface for configuring the I/O module assembly data storage structure 300. The editor 330 integrates a configurator control component 340 for configuration of bus parameters and settings.

A Profibus device 350 is a data storage structure corresponding to a Profibus device connectable to the I/O module assembly 110. In an exemplary embodiment, the configurator 320 uses the configurations of all Profibus devices assigned to the I/O module assembly 110 (represented in structure 300) for validation.

Turning to FIG. 4, a set of configuration definition groups are identified that comprise a portion of a configuration file for the I/O module assembly 110 coupled to a set of Profibus devices. I/O module bus parameters 400 provide a set of configurable properties defining a communications connection between the I/O module assembly 110 and the connected Profibus devices 112, 114, and 116. I/O module configuration data 410 comprises a set of fields specified via the configuration data manager 310 that define the general operation of the I/O module assembly 110. The I/O module configuration data 410 includes a file name identifying a configuration file.

Turning briefly to FIG. 5, an exemplary graphical user interface is depicted for specifying the I/O module bus parameters 400 and the I/O module configuration data 410. In the exemplary embodiment, the I/O module assembly is identified as FBM222 (a Profibus field bus module). In the illustrative example, a set of fields are provided for configuring the FBM222 ports, settings and bus parameters.

The top portion of the exemplary configuration interface depicted in FIG. 5 is associated with "FBM Settings". The set of configurable FBM settings includes: a master station address (assigned to the I/O module assembly 110). A highest station address corresponds to the highest address assigned to a connected Profibus Master station on the same Profibus network. The I/O module assembly 110 using the described configuration data will look for the other Master on a Profibus network from address 0 up to the HSA. An Auto clear on Error flag field enables a user to set an Auto Clear on Error flag. The flag is evaluated in Operate and Clear operation modes. If data transfer to at least one activated slave was not possible during a "Data Control Time", and (1) if an Error_Action_Flag is set, then the operation mode changes from Operate to Clear;

(2) if the Error_Action_Flag is not set, the operation mode remains in Operate in case of an error;

(3) if the Error_Action_Flag is set, the operation mode is only changed from Clear to Operate if, in the Data Control Time, all slaves were in the user data exchange mode.

A minimum slave interval value can range from 0 to 6553500 ms and the default value is 125 ms. The minimum slave interval value specifies a smallest allowed period of time between two slave poll cycles. The minimum slave interval value should be greater than or equal to the Minimum Slave Interval parameter of a slowest slave connected to the FBM. This value should be smaller than or equal to any watch dog timeout of the slaves. A Data Control Time can range, for example, from 0 to 655350 ms and the default value is 150 ms. The data control time indicates the maximum time interval within which a valid exchange of process data has taken place between the master and a slave.

The bottom portion of FIG. 5 is associated with configurable bus parameters. A segment coupler field allows a user to select a configurable segment coupler (e.g., SK1, SK2, SK3, etc.) to automatically specify a set of default bus settings associated with the selected segment coupler. When the user selects the segment coupler, the available baud rates for the selected segment coupler are provided in the baud rate combo box. The user selects one of the baud rates and clicks on a Defaults button to get the default values. A Baud rate field enables a user to select a baud rate for the I/O module 110. Selecting the Optimize Timing button invokes a calculation of optimized timing values for the I/O module assembly 110 based upon a set of connected slaves. A validate button enables a user to invoke validating a current master and slave configuration.

A Max Retry Limit field enables a user to specify a maximum number of communication retries a master does before confirming a slave device to be failure. A GAP Update Factor provides the number of token rounds between GAP maintenance (update) cycles. GAP is the amount of time between tokens being passed on the bus. In the illustrative example the value is always 1.

A slot time field identifies a maximum time for the I/O module assembly 110 to wait for a transaction response. A Minimum Station Delay Response Time field specifies a value sent to connected devices to ensure the devices connected to the I/O module assembly do not reply too quickly. A Maximum Station Delay Response Time field specifies the time after which the responder must have processed a request and responded, if applicable. A Setup Time field specifies a time delay between an event (for example timer interrupted) and the necessary reaction (for example, enabling receiver). A Quit Time field specifies a time a transmitting station must wait after the end of a frame before enabling its receiver. A Target Rotation Time field specifies an anticipated time for one token round on the PROFIBUS network, including allowances for high and low priority transactions, errors and GAP maintenance.

Profibus device bus parameters 420 provide a set of configurable bus parameters associated with Profibus devices that communicate with the I/O module assembly 110. In an exemplary embodiment, the Profibus device bus parameters 420 are specified via a graphical user interface depicted, by way of example, in FIG. 6. A Minimum station delay response time field specifies a minimum time to wait before generating a reply frame to the master. The default value for this field is 11 Tbit.

A Watchdog box includes an enabled field through which a user enables/disables a watchdog timer. An associated time out field holds a value specifying a watchdog timeout period.

A mode support box includes check boxes through which a user enables/disables specific global control functionality. The description of the check boxes present under this group is as follows:

Freeze (Check Box): allows specifying whether a slave will support Freeze mode. If the value of Freeze_Mode_Supp in the slave GSD (Profibus General Station Description) file is 0, then this check box is disabled. Otherwise, if the Freeze check box is checked, the slave supports the Freeze mode.

Sync (Check Box): allows specifying whether the slave will support Sync mode. If the value of Sync Mode Supp in the slave GSD file is 0, then the Sync check box is disabled. Otherwise, if the Sync check box is checked, the slave supports the Sync mode.

A Device Timeout for Disable Communication (Group Box) enables a user to specify how the Profibus device is treated when the communication to the Profibus device is broken. If Enable is checked, then the timeout value should be greater than 0 ms, if this timeout is defined a device equipment control block (e.g., ECB201) is set to "Disable Communication" when the communication to the device is broken for a duration larger than a timeout value specified in the Timeout field (e.g., 120 ms). Thus, if a device gets disconnected it is automatically set offline after the timeout. If Enable is not checked, then the Profibus device stays in an Enable Communication mode when communication is broken. The I/O module assembly 110 will try to set the Profibus device in online mode when it gets connected again.

A Groups box identifies a set of (8) selectable DPV1 groups.

A DPV1 box includes a set of fields associated with DPV1 functionality. An Enable DPV1 check box, when selected, specifies that a slave will use DPV1 functionality. A DPV1 Response Timeout field specifies a DPV1 response time out period. The default value for DPV1 response time is 4 sec (400 10 ms). A FailSafe check box enables a user to enable/disable a failsafe mode of operation for the Profibus device (slave). If checked the slave is operated in failsafe mode. In the failsafe mode the slave holds outputs at the last value received or sets outputs to a specified value in case of loss of communication. The user specifies the action of the slave outputs in a case of lost communication using device configuration tools. A watchdog time base check box changes the watchdog timeout base from 10 ms to 1 ms.

A module configuration 430 specifies a configuration of modules associated with connected Profibus devices and user parameters in the modules. The module configuration 430 is specified via a graphical user interface that displays a set of available modules and their associated parameters. In an exemplary embodiment (see, FIG. 7), a module configuration interface lists a set of "Available Modules" and "Configured Modules." A user adds a module from the Available Modules to a particular slot in the Configured Modules by selecting a module under the Available Modules list, selecting a slot where the module is to be added, and clicking an Add/Replace button. A user replaces a module at a particular slot in the Configured modules by: selecting a module in the Available Modules list, selecting a module in the Configured Modules list which is to be replaced, and clicking the Add/Replace button. The existing module at the selected slot is replaced. A user removes modules from the Configured modules by: selecting the module(s) under the configured modules list and clicking a Remove button. Finally, a user swaps modules present at two slots by using up and down arrows on the user interface. To swap a module with another module at a slot above it, a user selects the module which needs to be swapped and clicks the Up arrow. To swap a module with another module at a slot below it, a user selects the module which needs to be swapped and clicks a Down arrow. Directly beneath the Configured modules listing, input/output lengths of slave data and Configured Modules are tallied (in the second line). The maximum numbers for the input/output length and modules are obtained automatically from the GSD file for the Profibus device.

A Show Config Data button opens up a new dialog that shows the configuration data bytes of the modules in a tree view in a grid. By default all modules are in a collapsed state. To view the configuration data bytes of a module, a user clicks on a symbol given in the first column of the grid. This dialog allows the user to view the data bytes in Binary, Hex and Decimal formats. The user changes the display from one format to another format by selecting a corresponding radio button.

A separate user parameters display (see, FIG. 8) comprises a list of text strings identifying particular parameters of a selected module and the current value. The user parameters display enables a user to view and modify parameters in selected modules. The selected modules are provided in the "Module" list wherein each module is identified by a Module Name text string. When a user selects one of the listed modules, the selected module's parameters are listed under a "Module Parameters" list. The "Module Parameters" list displays the name of the parameter (a text string) and its value (as an alphanumeric string). When a user clicks on any of the listed module parameters, available values for the selected parameter are provided in a combo box beneath the Module Parameters list or an edit control allows input of values.

A User Param Data box displays user parameter values of all configured modules. A Max_User_Prm_Data_Len field specifies a maximum number of user parameter data bytes supported by the device. If the Profibus device is a DPV1 device then an Add DPV1 Bytes checkbox is shown. The user can add or remove three bytes of user parameter data by checking or unchecking the DPV1 checkbox respectively. A user edits a current value for a parameter by selecting an Edit button that launches a "User Parameter Data" edit dialog. The User Parameter Data edit dialog shows the user parameter data for configured modules in a tree view. By default all modules are in a collapsed state in the tree. To view the user parameter data of a module, user clicks on a "+" symbol provided in a first column of the display. The User Parameter Data dialog enables a user to view and edit the data bytes in Binary, Hex and Decimal formats. User navigates from one data format to another format by selecting a corresponding radio button.

A Profibus device status mask 440 comprises a set of data fields specifying a status mask for a Profibus device connected to the I/O module assembly. The Profibus device status mask 440 includes a set of actions to be performed when particular statuses are sensed. In the exemplary embodiment, a byte is allocated for specifying an action associated with a particular potentially sensed status.

Profibus device configuration data 450 specifies configuration data for a Profibus device connected to the I/O module assembly 110. The Profibus device configuration data includes a file name of a file containing the configuration information for the Profibus device.

Having described exemplary I/O module assembly configuration structures/user interfaces for the I/O module assembly 110 coupled to one or more Profibus devices, attention is directed to a set of configurator user interfaces through which the I/O module assembly 110 is configured to interact with connected Profibus devices and respond to I/O (DCI) requests from the control module assembly 108. A data definition user interface enables a user to configure cyclic input and cyclic output parameters and messages. In accordance with an exemplary embodiment, the defined data definition parameters are associated with DCI blocks and thus their information is included in responses provided by the I/O module assembly 110 to the control module assembly 108.

Turning to FIG. 9, an exemplary user interface for defining cyclic input parameters for a Profibus device is provided. The input parameter configuration user interface displayed in FIG. 9 includes two grids. A "Module and Input Data Structure" grid displays configured modules which have available input bytes. An "Input Parameters" grid enables a user to configure input parameters for the listed modules. If there are any already configured and saved input parameters, those are displayed when the display screen is initially rendered.

Referring first to the "Module And Input Data Structure" portion/grid of FIG. 9, information about various configured modules which have input bytes available is displayed. The first column identifies a module number (e.g., M1) and slot or the byte number. The modules and bytes under each module are arranged in the form of a tree. A user expands and collapses the tree to reveal/hide bytes of input information contained within particular modules. The second column provides the data information (module name or data area name or data type). By way of example, the data type information is taken from a "Data Area" section of the GSD file for the Profibus device and displayed in the second column.

Referring to the "Input Parameters" portion/grid of FIG. 9, the input parameters grid enables a user to define input parameters of various modules whose information is displayed in the Module and Input Data Structure portion. The Input Parameters grid (partially covered in the illustrative example) displays a name, data type, byte position, bit position, bit length, description, unit, lower range, upper range, swapping, complement, sign bit, status parameter and good status fields for each input parameter. A complete set of column headings is provided in the example set forth in FIG. 10.

Referring to FIG. 10, an exemplary set of fields for the Input Parameters grid is depicted along with an exemplary set of input parameter entries. A Name field is an editable string containing a user assigned name of an input parameter. A Data Type field specifies a type for the data (e.g., integer, Boolean, Floating point, Extended format, Packed bits, etc.). A Byte Position field specifies an editable starting byte position for the input parameter within the module. In the illustrative example the byte position is specified in a byte identifying a binary value between zero and 243. A Bit Position field, specifying a value between 0 and 7, is an editable field for entering a bit position within a byte from which the parameter definition starts. A Bit Length field is an editable field for entering a number of bits that are occupied by the input parameter.

A pair of fields of an input parameter enhances the understandability of the input parameter. A Description field specifies an editable string that describes the input parameter. A Units field specifies a particular set of units (e.g., degrees Celsius, meters, pounds, etc.) to be applied to the input value when rendered.

A lower range field specifies an editable value specifying a lowest value assignable to the input parameter. An upper range field specifies an editable value specifying a highest value assignable to the input parameter.

A next set of fields specifies manipulations to specified bytes of an input parameter. A swapping field includes a set of selectable options including: no swapping, or specified swapping for 2 bytes and 4 bytes. A complement field specifies either: no complement, 1's complement or 2's complement.

A sign bit position field contains an editable value specifying the location of a sign bit.

A status parameter field supports specifying an optional status parameter input value for determining the good/bad status of the specified input parameter. In the illustrative input parameter configuration user interface, the status parameter field for each listed input parameter is associated with a combo box control that presents a set of available input parameters from which a user designates a "status parameter" for the input parameter. Thus, for each input parameter for which a status parameter is designated, the DCI task 202 evaluates the associated status parameter and provides, in response to a DCI read request, both the requested input parameter value and the evaluated parameter status of the input parameter value. A timestamp representing when the particular input parameter data value was stored in the DCI repository 204 is also provided with each returned input parameter data value.

The timing of updates to the status of an input parameter varies in accordance with various illustrative embodiments. The DCI task 202 re-evaluates input parameter status without regard to whether a read request is pending for a particular input parameter. For example, the DCI task 202 re-evaluates an input parameter's status each time its primary value is updated in the repository 204. In an alternative embodiment, the parameter status (good/bad) is updated when a corresponding status parameter value changes. In yet another alternative embodiment, the DCI task 202 waits until a DCI read request is pending to re-evaluate the status of the input parameter. The latter update mode eliminates potential delays from re-evaluating statuses of each returned input parameter value and can be used in association with an alarm utility to expedite publishing alarms arising from bad input parameter statuses.

The content of the status information provided with an input parameter value differs in accordance with various exemplary embodiments. In a particular exemplary embodiment, the DCI task 202 returns either a "good" or "bad" parameter status value with each provided input parameter data value. By way of example, the DCI task 202 determines the good/bad status for an input parameter by applying a "Good Status" mask (see, e.g., "Good Status" column in FIG.

10), comprising a set of bits specifying "good" results for a set of input parameter data quality tests, to a set of actual input parameter data quality test results specified by the contents of a designated status parameter.

By way of example, a configured Good Status mask comprises a string of "0", "1" and "—" (don't care) characters. The values represented by these characters are applied to corresponding bit positions of the specified status parameter for the input parameter. In an illustrative example, the "1" and "0" characters specified in the Good Status mask are compared to the current values of corresponding bit positions in the specified status parameter. "Don't care" bit positions are skipped in the status parameter during the comparison. If, upon completing the comparison of bit positions where either a 1 or 0 was specified in the Good Status mask, all bit values match, then a "good status" value is attached by the DCI task 202 to the parameter data value returned to the control module assembly 108 for the particular input parameter.

A wide variety of forms of parameter status information are potentially conveyed with input parameter values provided by the DCI task 202 when updating input parameters for the control module assembly 108. For example, while the above-described illustrative embodiment attaches a simple "good"/"bad" status value to each input parameter (based upon one or more underlying tests—any one of which could render a "bad" status), in alternative embodiments more descriptive status values are provided with the input parameter value. For example, rather than merely providing a good/bad designation, the status value provided with the input parameter value comprises a set of error codes corresponding to each failed test.

Furthermore, a variety of test schemes, represented in the illustrative example by the individual bits of a status parameter, are contemplated. For example, in a particular embodiment, a standard set of tests are represented by corresponding bit positions of a status parameter byte associated with a particular status parameter. In the illustrative example the following tests are associated with an assigned bit position in the status byte:

1: Parameter Value is Bad
2: Parameter Value is Unavailable (Out of service)
3: Parameter Value is Questionable
4: Parameter Value Source is Disconnected
5: Parameter Value Out of prescribed range high
6: Parameter Value Out of prescribed range low However, in alternative embodiments, the set of tests associated with the individual bits are customizable and vary according to, for example, the type of input parameter or a class of input parameters.

Returning to FIG. 9, a user adds a parameter to the configured Input Parameters list by:

1) Dragging and dropping an input byte from the Module and Input Data Structure grid onto the Input Parameters grid. This action adds an input parameter under a respective module in the hierarchical tree structure of modules and associated parameters. Upon adding the input byte to the Input Parameters, the data type, byte position, bit position and bit length fields are filled in the Input Parameters grid based on the values from the module and input data structure grid.

2) Within the hierarchical tree structure, an empty row is provided at the end of each module to define new parameters. Whenever a user edits a last row or presses a tab key on a last cell of a module, an empty row is added to the end of the module. The user directly defines an input parameter in the new row. Unlike the first approach, in this case the user has to define the data type, bit position and bit length values.

For each input parameter, user can select the data type, swapping, complement, status parameter from the available values in a combo box. The combo boxes are not editable. The user is provided with the option of deleting a defined parameter.

Figure 11:
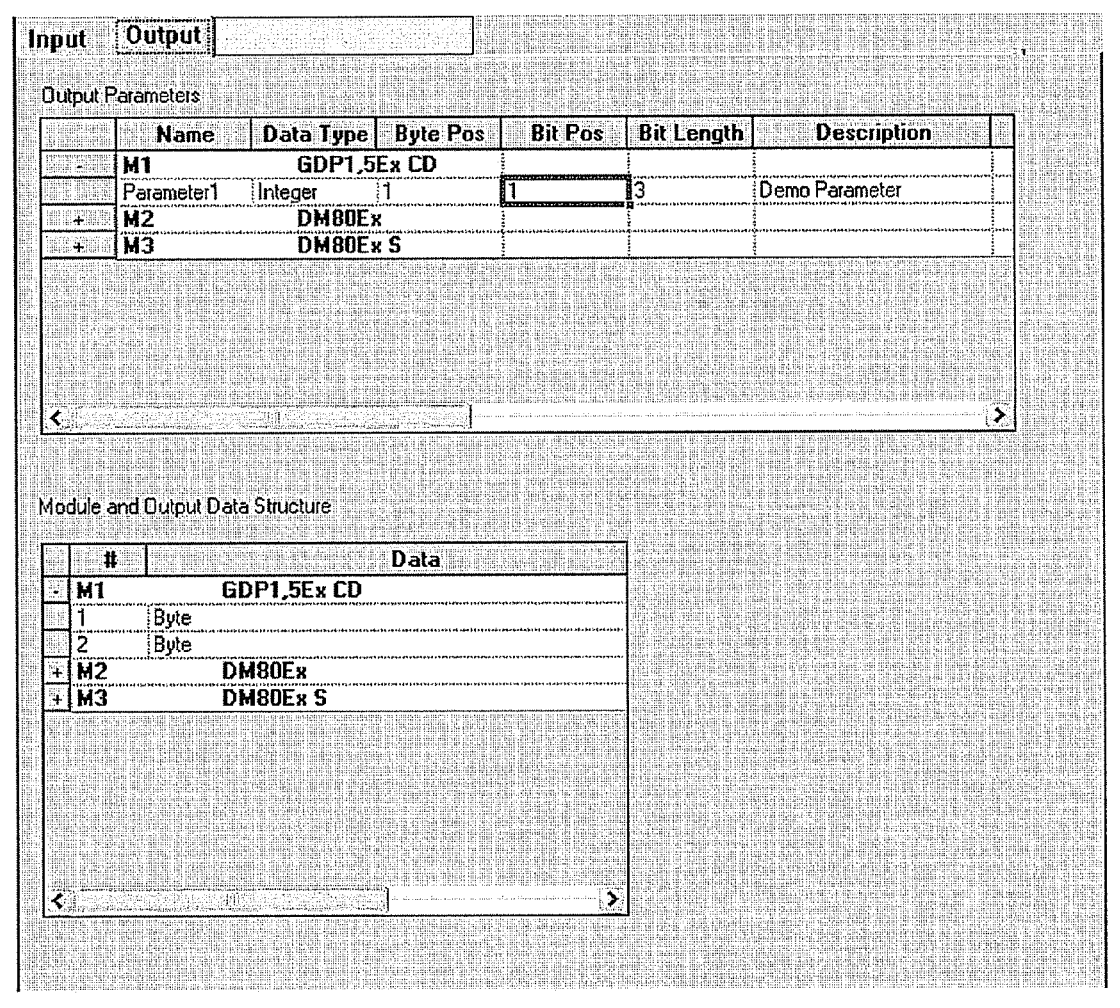

Attention is now directed to configuration of output parameters. Turning to FIG. 11, an exemplary user interface for defining cyclic output parameters for a Profibus device is provided. The output parameter configuration user interface displayed in FIG. 11 includes two grids. A "Module and Output Data Structure" grid displays configured modules which have available output bytes. An "Output Parameters" grid enables a user to configure output parameters for the listed modules of a Profibus device. If there are any already configured and saved output parameters, those are displayed when the display screen is initially rendered.

Referring first to the "Module And Output Data Structure" portion/grid of FIG. 11, information about various configured modules which have output bytes available is displayed. The Module and Output Data Structure grid provides information about various configured modules which have output bytes available. The Module and Output Data Structure grid has two columns. The modules and bytes under each module are represented in the form of a tree within the left column. A user expands and collapses the tree. Initially the tree displays the collapsed modules. The first column provides either the module number and slot or a byte number. The second column provides data information (module name or data area name or data type).

The Output Parameter grid enables users to define output parameters whose information is available in the above-described Module and Output Data Structure grid. The Output Parameters grid (partially covered in the illustrative example) displays, by way of example, the following output parameter information stored within fields associated with an output parameter: name, data type, byte position, bit position, bit length, description, unit, lower range, upper range, read back parameter, swapping and complement. A complete set of column headings is provided in the example set forth in FIG. 12.

Referring to FIG. 12, an exemplary set of fields for the Output Parameters grid is depicted along with an exemplary output parameter entry. A Name field is an editable string containing a user assigned name of an output parameter. A Data Type field specifies a type for the output data parameter (e.g., integer, Boolean, Floating point, Extended format, Packed bits, etc.). A Byte Position field specifies an editable starting byte position for the output parameter within the module. In the illustrative example the byte position is specified in a byte identifying a binary value between zero and 243. A Bit Position field, specifying a value between 0 and 7, is an editable field for entering a bit position within a byte from which the output parameter definition starts. A Bit Length field is an editable field for entering a number of bits that are occupied by the output parameter.

A pair of fields of an input parameter enhances the understandability of the output parameter. A Description field specifies an editable string that describes the output parameter. A Units field specifies a particular set of units (e.g., degrees Celsius, meters, pounds, etc.) to be applied to the output value when rendered.

A lower range field specifies an editable value specifying a lowest value assignable to the output parameter. An upper range field specifies an editable value specifying a highest value assignable to the output parameter.

A next set of fields specifies manipulations to specified bytes of an output parameter. A swapping field includes a set of selectable options including: no swapping, or specified swapping for 2 bytes and 4 bytes. A complement field specifies either: no complement, 1's complement or 2's complement.

A Read Back parameter field is associated with a combo box that presents a set of available Input parameters from which a user designates a "Read back" parameter. The Read back parameter field thus enables a user to choose an optional input parameter that is associated with the output parameter value. In an exemplary embodiment, the data repository 204 includes both an output field (storing an output parameter value to be written to a Profibus device) and a read back field (storing an input parameter value read from the Profibus device). The read back field can specify an actual current value for a specified input parameter or, alternatively, a "reference" to the input parameter (the designated read back parameter for the output parameter). Thus, for example, a valve position output parameter can specify an associated read back/input parameter that provides the currently registered position of the valve positioner. In an exemplary embodiment, during runtime the read back field for an output parameter is updated in the repository 204 with the current value of the specified read back input parameter value. The read back value for an output parameter is returned to the control module assembly 108 in response to a read request that references the read back field of the output parameter. The ability to specify a read back parameter facilitates easier identification of an input parameter representing the effect of a specified output parameter value from a control loop programming point of view since the association between input and read back parameters is specified during the configuration of an I/O module assembly 110 for a Profibus device.

Returning to FIG. 11, a user adds an output parameter by either of the following methods:

1) Dragging and dropping an output byte from the Module and Output Data Structure grid onto the Output Parameter grid. The dragging/dropping action adds an output parameter under a respective module in the hierarchical tree structure. On doing this the data type, byte position, bit position and bit length fields are filled based on the values from the Module and Output Data Structure grid.

2) Within the hierarchical tree structure of the Output Parameter grid an empty row is provided at the end of each module to define new parameters. Whenever the user edits the last row or presses a tab key on the last cell of each module in the Output Parameters grid, an empty row is added to the end of the module. The user directly defines an output parameter in this row. Unlike the drag/drop approach, in this case the user defines data type, bit position and bit length fields.

For each output parameter, a user selects the data type, swapping, complement, and read back parameter from the available values in a combo box. These combo boxes are not editable. A user is permitted to edit the values of rest of the fields. The user is provided with the option of deleting a defined parameter.

Figure 13:
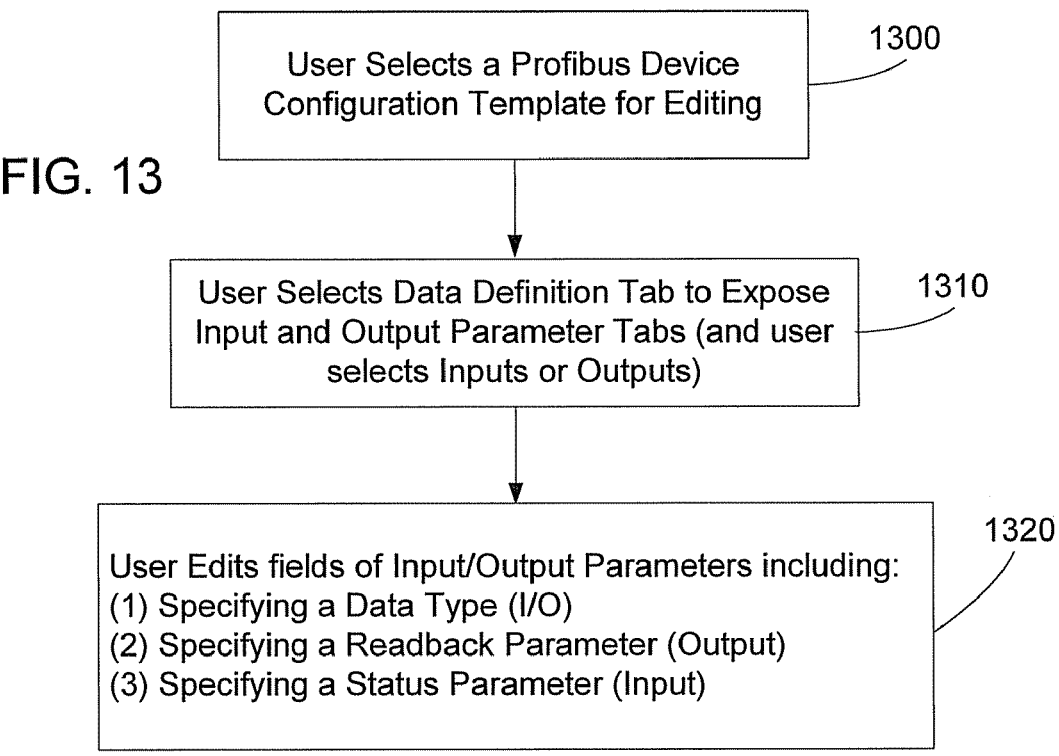
FIG. 13 is a flowchart summarizing an exemplary set of steps for defining the Input and Output parameters of a Profibus device.

Turning to FIG. 13, an exemplary set of steps are summarized for defining the Input and Output parameters of a Profibus device previously discussed herein above with reference to FIGS. 9-12. The Profibus device I/O parameters are exposed to, and used by, a control program executed by the control module assembly 108. The parameter values are passed between the I/O module assembly 110 and the control module assembly 108 via DCI blocks defined for the Profibus device. Therefore, after defining a set of I/O parameters, the user maps the I/O parameters to DCI blocks executed in the control module assembly 108.

Initially, during step 1300, a user selects a Profibus device (template or instance) and the corresponding configuration file is accessed by the workstation 102's configurator application. During step 1310 Data Definition tab is selected to provide access to a set of selectable tabs for accessing Input and Output parameters associated with the selected Profibus device. During step 1320 fields (e.g., name and attribute fields) of existing entries and/or entire entries are modified in one or both of the Input Parameters and the Output Parameters lists are edited. During step 1320 the following user-directed operations are potentially performed to specify the name and attributes for an I/O parameter:

(1) a user navigates input or output data in a separate list that displays the module borders and the number of bytes within a module for a Profibus device.

(2) the user is supported in defining the data type. For example, by "right clicking" in the data type field, a context menu opens to specify the data type. The selected data type and the bit length are entered for the parameter and are read-only if the data type (e.g. Real) is well defined.

(3) the user is supported in defining a readback (read-back) parameter of an output parameter. As explained previously herein above, the readback field for an output parameter specifies an input parameter from which the value of the output parameter is specified. A user accesses the potential input parameters from which a readback parameter is specified by right clicking in the readback field. Thereafter, a list is displayed showing the choices of input parameters that can be designated as the readback parameter for the output parameter.

(4) the user is supported in defining a status parameter (see, "Status Parameter" field in FIG. 10 described herein above) associated with an input parameter. As explained previously herein above, the status parameter is evaluated in association with an input data value and represents the status of the input parameter data. In an exemplary embodiment, a user accesses the potential status parameters by right clicking in the status field, and a list is displayed showing the possible choices of Input parameters from which the status parameter is selected. In addition to selecting an input parameter, the user also defines a status bit mask for verifying good status (see, "Good Status" in FIG. 10) for the status parameter.

Separately, via a control program editor utility, a user creates a process control program executable on the control module assembly 108. The control program includes DCI blocks for writing/reading data to/from a Profibus device via the I/O module assembly 110.

Figure 14:
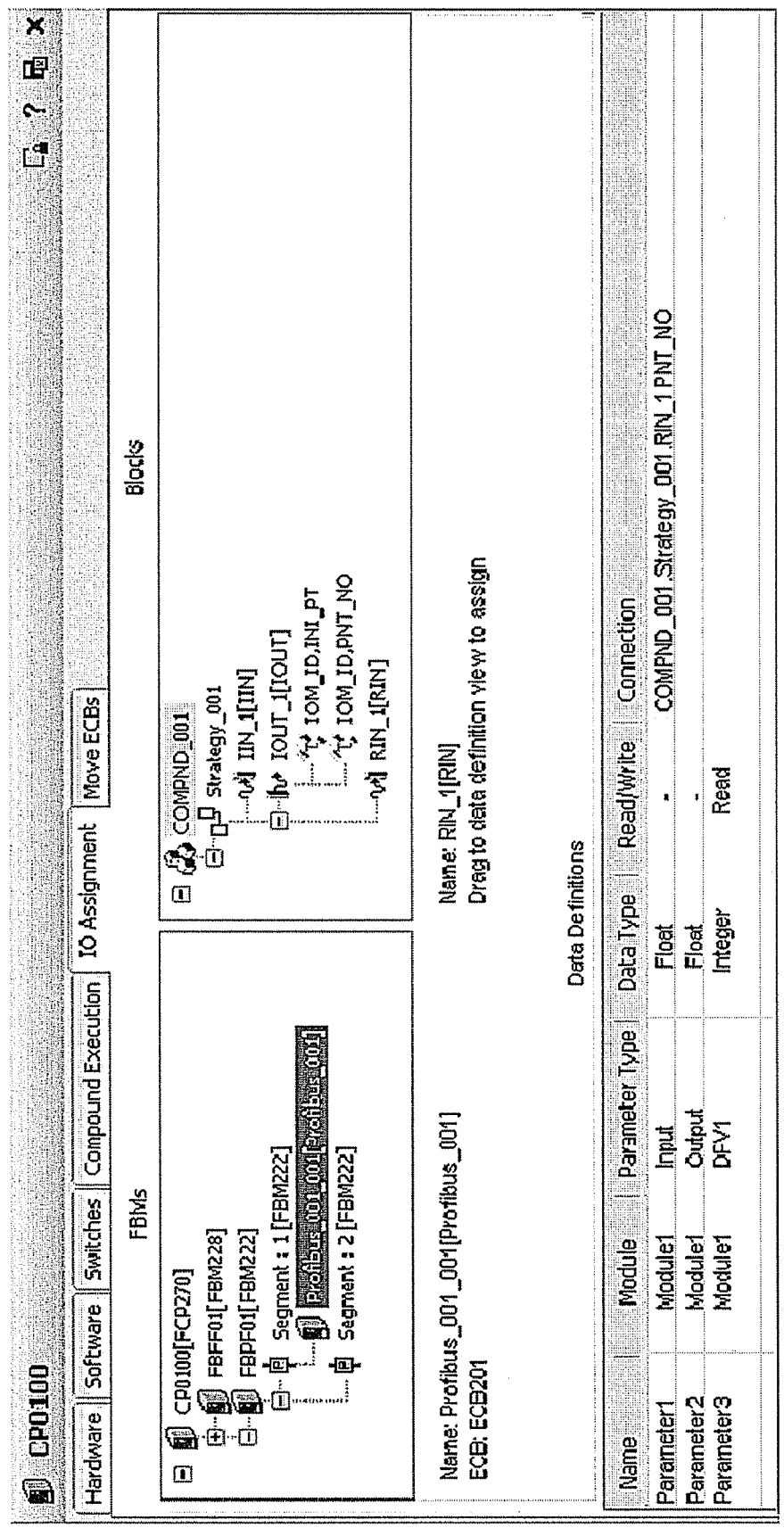
FIG. 14 is an exemplary user interface for creating connections between DCI blocks and corresponding Profibus input/output parameters.

Furthermore, in an exemplary embodiment, a data connections utility having a user interface depicted, by way of example in FIG. 14, facilitates assigning DCI blocks to particular ones of the input/output parameters defined via the Profibus device input/output configuration user interfaces described herein above with reference to FIGS. 9-12. After a configuration has been downloaded to the I/O module assembly 110, the connections defined via the data connection editor interface depicted in FIG. 14, tie DCI blocks on the control module assembly 108 to corresponding Profibus device I/O parameters maintained in the DCI repository 204 of the I/O module assembly 110.

A user selects a Profibus device from the FBM configuration tree depicted in the top-left corner of the illustrative user interface. Thereafter, a set of input and output parameters configured for the selected Profibus device are depicted in the "Data Definitions" section of the user interface. A user creates a connection by simply selecting a DCI block from the "Blocks" section in the top-right corner of the user interface, and dropping the selected block on a particular row in the "Data Definitions" section. It is noted that only one DCI block can be connected to an output parameter listed in the "Data Definitions". However, multiple DCI blocks can share a single input parameter. Thus, dropping a DCI block on an input parameter for which a DCI block was previously assigned results in the creation of a second row identifying the same input parameter. The created connection is incorporated into the configuration definitions maintained within the DCI repository 204 for later use by the DCI task 202 when carrying out DCI requests on behalf of the control module assembly 108.

Figure 15:
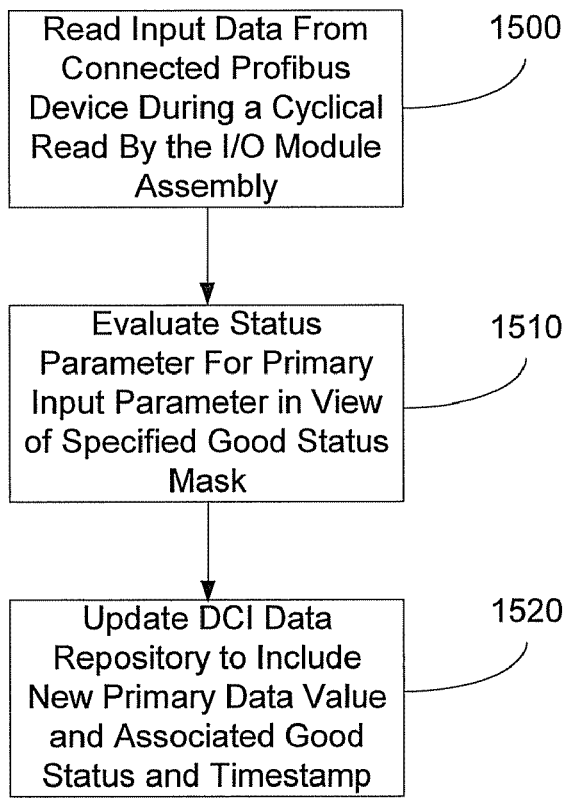
FIG. 15 is a flowchart summarizing a set of steps for providing an input parameter with an associated status parameter.

Having described exemplary runtime arrangements and configuration operations, attention is directed to FIG. 15 that summarizes a set of steps performed by the I/O module assembly 110 in response to a parameter read operation for an input parameter having an associated status parameter (and "good status" mask). It is noted that while the present example is provided for a single input parameter, such read operations are generally carried out with regard to a set of input parameters provided by the I/O module assembly 110 to the control module assembly 108.

Initially, during step 1500, a set of input values are read by the I/O module assembly 110. By way of example, the I/O data scan task 218 maintains a local version of the cyclic scan list for the I/O module assembly 110 to read I/O data from Profibus devices. Thereafter, in response to notification of completion of the input data scan during step 1500 (wherein values are updated for a primary input parameter as well as a status parameter associated with the primary input parameter), during step 1510 the I/O data scan task 218 processes the current value of the associated status parameter in view of a good data mask specified by the primary input parameter to render a good/bad status value for the primary input parameter. During step 1520, the I/O data scan task 218 updates DCI connection records in the DCI data repository 204 corresponding to the primary input parameter. By way of example, for primary input parameters having a defined input status value parameter, the I/O data scan task 218 evaluates the associated status parameter byte for an input primary value parameter and updates a corresponding DCI block data item in the DCI data repository 204 to include a current primary input value, a good/bad status, and a time stamp. The stored primary input value and associated good/bad status are thereafter provided to a control module assembly 108 in response to a read request. In an exemplary embodiment, the DCI read does not require any separate read operation to obtain both the primary input value and its associated good/bad status.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software, stored on computer-readable media in the form of computer executable instructions, may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for managing Profibus device information in a distributed control system wherein a Profibus device is communicatively coupled via a network link to an I/O module assembly, wherein the I/O module assembly receives Profibus device messages from the Profibus device containing information relating to connected device modules, and wherein the I/O module assembly includes one or more tasks for extracting and processing information contained within the received Profibus device messages according to a Profibus device configuration, the method comprising:

receiving, by the I/O module assembly, input parameter data originating from a Profibus device message issued by a connected Profibus device;

processing, by an I/O request processing task, in accordance with the Profibus device configuration, the Profibus device message by performing the additional steps of:

extracting input parameter values from the Profibus device message according to input parameter configuration entries in the Profibus device configuration, and depositing the input parameter values in an I/O data repository on the I/O module assembly, the depositing step including storing:

a measured value for a first input parameter, and a status value for a first status parameter corresponding to the first input parameter;

maintaining, by the I/O module assembly, a reference linking the first status parameter to the first input parameter; and providing, by the I/O module assembly, a data status value with the measured value for the first input parameter in accordance with an I/O read operation executed on the I/O module assembly wherein the data status value is based on the status value for the first status parameter.

2. The method of claim 1 further comprising: evaluating the status value for the first status parameter according to a status mask to render the data status value.

3. The method of claim 2 wherein the data status value identifies a good data status.

4. The method of claim 2 wherein the status mask is specified via a configurable field associated with the first input parameter.

5. The method of claim 4 wherein the status mask specifies a set of values designating how to evaluate particular portions of the status value for the first status parameter.

6. The method of claim 5 wherein the set of values comprise logical values.

7. The method of claim 6 wherein the set of values supports a "don't care" designation for a particular portion of the status value for the first status parameter.

8. The method of claim 2 wherein the first status parameter is specified in a configurable status parameter field for the first input parameter.

9. The method of claim 1 wherein the providing step comprises providing a timestamp value corresponding to a most recent time when the processing step was performed.

10. The method of claim 1 wherein the providing step is performed by the I/O module assembly in response to receiving a read request from a control processor executing a regulatory control program.

11. A system for managing Profibus device information in a distributed control system, the system comprising:

a Profibus device;

an I/O module assembly communicatively coupled to the Profibus device via a network link, wherein the I/O module assembly receives Profibus device messages from the Profibus device containing information relating to connected device modules, and wherein the I/O module assembly includes a computer-readable medium having computer-executable instructions for extracting and processing information contained within the received Profibus device messages according to a Profibus device configuration, the computer-executable instructions facilitating performing the steps of:
receiving, by the I/O module assembly, input parameter data originating from a Profibus device message issued by a connected Profibus device;
processing, by an I/O request processing task, in accordance with the Profibus device configuration, the Profibus device message by performing the additional steps of:
  extracting input parameter values from the Profibus device message according to input parameter configuration entries in the Profibus device configuration, and
  depositing the input parameter values in an I/O data repository on the I/O module assembly, the depositing step including storing:
    a measured value for a first input parameter, and
    a status value for a first status parameter corresponding to the first input parameter;
maintaining, by the I/O module assembly, a reference linking the first status parameter to the first input parameter; and
providing, by the I/O module assembly, a data status value with the measured value for the first input parameter in accordance with an I/O read operation executed on the I/O module assembly wherein the data status value is based on the status value for the first status parameter.

12. The system of claim 11 wherein the I/O module assembly comprises further computer-executable instructions for evaluating the status value for the first status parameter according to a status mask to render the data status value.

13. The system of claim 12 wherein the data status value identifies a good data status.

14. The system of claim 12 wherein the status mask is specified via a configurable field associated with the first input parameter.

15. The system of claim 14 wherein the status mask specifies a set of values designating how to evaluate particular portions of the status value for the first status parameter.

16. The system of claim 15 wherein the set of values comprise logical values.

17. The system of claim 16 wherein the set of values supports a "don't care" designation for a particular portion of the status value for the first status parameter.

18. The system of claim 12 wherein the first status parameter is specified in a configurable status parameter field for the first input parameter.

19. The system of claim 11 wherein the providing step comprises providing a timestamp value corresponding to a most recent time when the processing step was performed.

20. The system of claim 11 wherein the providing step is performed by the I/O module assembly in response to receiving a read request from a control processor executing a regulatory control program.

* * * * *